United States Patent [19]
Ogoe et al.

[11] Patent Number: 5,663,280
[45] Date of Patent: Sep. 2, 1997

[54] CARBONATE POLYMER RESINS CONTAINING LOW VOLATILITY AROMATIC PHOSPHATE ESTER COMPOUNDS

[75] Inventors: Samuel A. Ogoe, Missouri City; Nancy J. Schrock; Jimmie D. Spoon, both of Lake Jackson, all of Tex.

[73] Assignee: The Dow Chemical Company, Midland, Mich.

[21] Appl. No.: 636,291

[22] Filed: Apr. 23, 1996

Related U.S. Application Data

[63] Continuation-in-part of Ser. No. 547,090, Oct. 23, 1995.

[51] Int. Cl.$^6$ .................................................. C08G 64/00
[52] U.S. Cl. .................... 528/196; 524/139; 524/140; 524/141; 524/143; 528/167; 528/198; 528/398; 528/401
[58] Field of Search ............................ 528/167, 196, 528/198, 398, 401; 524/139, 140, 141, 143

[56] References Cited

U.S. PATENT DOCUMENTS

| | | | |
|---|---|---|---|
| 3,852,393 | 12/1974 | Furukawa et al. | 528/196 |
| 4,092,291 | 5/1978 | Mark | 528/196 |
| 4,214,062 | 7/1980 | Binsack et al. | 525/470 |
| 4,254,015 | 3/1981 | Thomas et al. | 528/196 |
| 4,463,130 | 7/1984 | Serini et al. | 525/67 |
| 4,486,560 | 12/1984 | Thomas | 524/100 |
| 4,532,284 | 7/1985 | Ogoe | 524/169 |
| 4,563,496 | 1/1986 | Lindner et al. | 524/430 |
| 4,626,563 | 12/1986 | Ogoe et al. | 524/168 |
| 4,692,488 | 9/1987 | Kress et al. | 524/139 |
| 4,727,101 | 2/1988 | Ogoe et al. | 524/83 |
| 4,766,165 | 8/1988 | Kress et al. | 524/140 |
| 4,837,258 | 6/1989 | Laughner et al. | 524/168 |
| 4,929,663 | 5/1990 | Laughner et al. | 524/423 |
| 5,109,044 | 4/1992 | Ho et al. | 514/142 |
| 5,204,394 | 4/1993 | Gosen et al. | 524/125 |
| 5,258,432 | 11/1993 | Ogoe et al. | 524/141 |
| 5,276,077 | 1/1994 | Schwane et al. | 524/133 |
| 5,278,212 | 1/1994 | Nishihara et al. | 524/141 |
| 5,478,874 | 12/1995 | Miyouga et al. | 524/156 |

FOREIGN PATENT DOCUMENTS

| | | |
|---|---|---|
| 103 230 A | 3/1984 | European Pat. Off. . |
| 174 493 | 3/1986 | European Pat. Off. . |
| 0637609A2 | 3/1994 | European Pat. Off. ......... C08K 5/00 |
| 2921325 A | 12/1979 | Germany . |
| 59-045351 A | 3/1984 | Japan . |
| 59-202240 A | 11/1984 | Japan . |

OTHER PUBLICATIONS

Green, Joseph; "PB–460 and PB–528 Brominated Phosphate Ester Flame Retardants", Fire Retardant Chemicals Association Meeting, Grenelefe, Florida, Mar. 21, 1988.

*Primary Examiner*—Terressa Mosley

[57] ABSTRACT

Disclosed is a carbonate polymer composition comprising (a) a carbonate polymer having a weight average molecular weight of from about 20,000 to about 40,000 and (b) from greater than about 0.1 to less than about 1.0 weight percent (based on carbonate polymer composition weight) low volatility aromatic phosphate ester compound, and optionally (c) from about 0.001 to about 0.1 weight percent (based on carbonate polymer compositions weight) of an alkali metal salt having a pH of at least about 7. Preferably the low volatility aromatic phosphate ester is selected from the group of aromatic phosphate ester oligomer compounds or haloaryl phosphate compounds. It has been found to be preferable to use a low volatility aromatic phosphate ester which experiences a weight loss of no more than 5 weight percent at 250° C. when heated to a temperature of 500° C. in a thermogravimetric analysis (TGA) at a heating rate of 20° C. per minute, more preferably no more than 40 percent at 300° C. It has been found that these compositions surprisingly achieve the Underwriters Laboratory (UL-94) V-2 rating without significantly sacrificing the otherwise good combinations of properties of carbonate polymer resins.

22 Claims, No Drawings

CARBONATE POLYMER RESINS CONTAINING LOW VOLATILITY AROMATIC PHOSPHATE ESTER COMPOUNDS

CROSS-REFERENCE STATEMENT

This is a continuation-in-part of U.S. Ser. No. 08/547,090, filed on Oct. 23, 1995.

FIELD OF INVENTION

This invention relates to carbonate polymer compositions which contain specific limited amounts of certain aromatic phosphate ester compounds. It has been found that these compositions surprisingly achieve the Underwriters Laboratory (UL-94) V-2 rating without significantly sacrificing the otherwise good combinations of properties of carbonate polymer resins. The carbonate polymers according to this invention are thus found to possess surprisingly good combinations of UL-94 V-2 rating, thermal stability, toughness, processability, hydrolytic and chemical resistance, appearance and optical properties and retention of the additives under melt conditions.

BACKGROUND OF THE INVENTION

Skilled practitioners in the field of thermoplastic resins recognize that the wide range of applications for resins requires differing types of behavior in burning or flame contact conditions. It is also well understood that any application requires cost/benefit optimization of a resin. For example, for the carbonate polymers used in preparing extruded sheet for glazing or other applications it is desired to achieve the Underwriters Laboratory (UL-94) V-2 rating, preferably to achieve this rating simultaneously at thicknesses in the range of one eighth and one sixteenth of an inch (0.125 and 0.0625 inch), while retaining the additives under melt conditions and maintaining the necessary levels of thermal stability, toughness, processability, hydrolytic and chemical resistance, appearance and optical properties.

As is recognized, V-2 performance of the resin characterizes a certain behavior of an article or part molded from the resin under burning conditions. The V-2 rating requires the polymer resin part to self-extinguish within 30 seconds or less after application of a flame from a Bunsen burner that initially ignites the resin part. For the UL-94 test, the resin to be tested is molded into bars having a standard size and shape and 5 bars are tested. In a controlled environment protected from drafts and under specified temperature and humidity conditions, the bars are held in a vertical position while a blue 0.75 inch (20 millimeter) flame from a Bunsen burner is applied to the center of the lower end of the part for ten seconds. The center of the flame is applied to the middle point of the bottom edge of the bar so that the top of the burner is 10 millimeters below the lower end of the specimen. Typically, for a V-2 rated resin, the part initially ignites and is then timed until it self extinguishes (T-1). As soon as the burning part extinguishes, the flame is reapplied for a second ten second time period. Again, the time is recorded until the part self extinguishes (T-2). If the part does not ignite at the first and/or second flame application T-1 and/or T-2 are zero seconds. This is repeated for all 5 bars. If each of the 5 bars self-extinguishes within 30 seconds after each application of the flame and the total burn times (T-1 plus T-2) for all five bars is less than 250 seconds, the resin is rated at least V-2. If any of the 5 bars fails to self-extinguish within 30 seconds after either flame application (T-1 or T-2 are greater than 30 seconds), the resin fails the V-2 test.

Although requiring the polymer part to stop burning within 30 seconds, a V-2 rating in this UL test does acknowledge that molten, flaming polymer drips off the test part under burning conditions and ignites cotton placed underneath. If there are no polymer drips that ignite the cotton, the resin is classified as V-1. The higher UL-94 ratings (V-0 or 5V) are based on shorter flame extinguish times or elimination of the dripping phenomena.

It should be noted that the dripping often removes the ignited polymer from the part and may actually be responsible for stopping the burning of the part. It should also be noted that the user of such resins has to determine the suitability of these resins for any particular application taking into account the dripping polymer, which may be flaming or burning. Any use herein of terms such as ignition resistant or flame retardant, or of UL-94 ratings or other numerical values derived from tests related to burning or the application of a flame, are not intended to reflect hazards presented by the disclosed carbonate polymer compositions or any other material under actual fire conditions. As used herein, the terms "ignition resistance" or "ignition resistance additives" may include or induce the situation where the molten, flaming polymer portion drips off the test part under burning conditions and the test part thereby stop burning.

As used herein to rate and categorize the polymer compositions as to their flame contact behavior, the UL-94 evaluations of the polymer compositions are based only on the performance as a natural, unpigmented resin. When the Underwriters Laboratory performs the test and issues an official UL rating, pigmented and natural versions of the resins are evaluated and all must meet the requirements for a particular rating in order for that polymer composition to receive the rating.

In the past, most polycarbonate resins having melt flow rates in the range of 20 grams per ten minutes and lower had inherently achieved the Underwriters Laboratory (UL-94) V-2 rating at thickness down to one eighth and one sixteenth of an inch without the incorporation of further additives. This was due to their relatively low tendency to burn (compared to many other polymers) and their tendency to reduce in melt strength and drip under burning conditions, extinguishing the burning of the part by removing the burning polymer from the part being tested. It appears that improvements or changes in the polymer process or quality have increased the melt strength of the carbonate polymers to the point that the polymer does not drip as readily. Although the higher melt flow rate (lower molecular weight) carbonate polymers not containing any further additives still have a V-2 rating in the UL-94 test, it has now been found that carbonate polymers having melt flow rates in the range of 20 grams per ten minutes and lower that would previously have been V-2 rated without further ignition suppressing additives, do not drip until after the polymer has burned for an extended time and the desired V-2 performance is not obtained.

In attempting to now modify the behavior of a polymer under burning or flame contact conditions, a skilled practitioner in this field recognizes there are countless additives and additive combinations that are taught to provide ignition resistance and/or affect the melt strength or dripping behavior of carbonate polymers. Since V-2 performance was already practically inherent in many unmodified carbonate polymers, most efforts had been directed to developing additive formulations for achieving the higher V-1, V-0 or 5V UL ratings based on shorter flame extinguish times or elimination of the dripping phenomena. Although levels of the additives were always desired to be minimized to reduce the accompanying loss of the carbonate polymer properties, there is no teaching as to which additives and/or which levels were able to increase the tendency of the polymer to drip under flame contact conditions, thereby providing carbonate polymers having a V-2 UL-94 rating and simultaneously maintaining the otherwise good balance of the unmodified carbonate polymer physical and optical properties.

Among the large number of potential additives for carbonate polymers generally, a variety of phosphorous compounds are known for use as additives in carbonate polymer compositions to achieve incombustibility or ignition resistance of the composition. Phosphorous esters such as the tri(phenyl) phosphates described in U.S. Pat. No. 5,258,432, and the oligomeric phosphates described in U.S. Pat. No. 5,204,394, are representative of some of the phosphorous compounds which have been disclosed as flame retardant additives with or without other additives. In U.S. Pat. No. 5,109,044 haloaryl phosphates are used in ignition resistance formulations in carbonate polymer blends. In JP 59-45,351-A (1984) it is taught that levels of at least 1 weight percent ("wt %") aromatic polyphosphate additive provides incombustible polyamide or polycarbonate compositions. In JP 59-202,240-A (1984) it is also taught that levels of at least 5 weight percent polyphosphoric acid esters provide flame retardance in a range of polymer compositions.

U.S. Pat. No. 3,852,393 discloses a flame retardant blend of polycarbonates with ABS resins and a halogenated hydrocarbon flame retardant. U.S. Pat. No. 4,463,130 discloses a flame retardant blend of polycarbonates with a halogenated flame retardant, polystyrene, polytetrafluoroethylene resins, and a polyphosphate. U.S. Pat. No. 4,563,496 discloses the use of a combination of halogenated compounds and metal oxides to improve the ignition resistance of blend of polycarbonate and acrylonitrile-butadiene-styrene copolymer (ABS). U.S. Pat. No. 4,692,488 discloses a blend of a polycarbonate, a copolymer of styrene and acrylonitrile, triphenylphosphate, and polytetrafluoroethylene.

The article by Joseph Green "PB-460 and PB-528 Brominated Phosphate Ester Flame Retardants" (Fire Retardant Chemicals Association Meeting, Grenelefe, Fla., Mar. 21, 1988) discloses that PB-460 and PB-528 are brominated aromatic phosphate esters with 60–70 percent bromine and 3–4 percent phosphorus. The article by Joseph Green "Brominated Phosphate Ester Flame Retardants for Engineering Thermoplastics" (Fire Retardant Chemicals Association Meeting, San Antonio, Tex., Mar. 12, 1989) discloses that PB-460 is a brominated aromatic phosphate ester with 60 percent bromine and 4 percent phosphorus and that when blended at high concentrations (17.5 weight percent) with Teflon 6C, into blends of polycarbonate and ABS resins, the blend has a V-0 UL-94 rating.

Alkali metal sulfonamide (also referred to as sulfimide) compounds are disclosed for use in carbonate polymer formulations in U.S. Pat. Nos. 4,254,015; 4,486,560; 4,532,284; 4,626,563; 4,727,101; 4,837,258; 4,929,663 and 5,276,077. Other alkali metal sulfonate salts are also suggested for use in carbonate polymers in U.S. Pat. Nos. 4,092,291 and 4,214,062.

Although the references disclose the incorporation of various phosphorous-containing additives into a carbonate polymer along with a very large number of other types of additives, there is no teaching as to which additives and/or which levels were able to provide carbonate polymers having a V-2 UL-94 rating, preferably both at a thickness of one eighth of an inch (⅛") and a thickness of one sixteenth of an inch (1/16"), and maintain or improve the other desirable properties of the resin. It is consequently an object of this invention to obtain a carbonate polymer having the desired V-2 performance level as well as maintaining the necessary levels of thermal stability, toughness, processability, hydrolytic and chemical resistance, appearance, optical properties and retention of the additives under melt processing conditions.

SUMMARY OF THE INVENTION

This invention pertains to a carbonate polymer composition comprising (a) a carbonate polymer having a weight average molecular weight of from about 20,000 to about 40,000 and ignition resistance additives consisting essentially of (b) from greater than about 0.1 to less than about 1.0 weight percent (based on carbonate polymer composition weight) low volatility aromatic phosphate ester compound, and optionally (c) from about 0.001 to about 0.1 weight percent (based on carbonate polymer compositions weight) of an alkali metal salt having a pH of at least about 7. Preferably the low volatility aromatic phosphate ester is selected from the Group of aromatic phosphate ester oligomer compounds or haloaryl phosphate compounds. It has also been found to be preferable to use a low volatility aromatic phosphate ester which experiences a weight loss of no more than 5 weight percent at 250° C. when heated to a temperature of 500° C. in a thermogravimetric analysis (TGA) at a heating rate of 20° C. per minute, more preferably no more than 40 percent at 300° C.

In another preferred embodiment, the present invention is a carbonate polymer composition as described above comprising no added ignition resistance additive(s) based on halogen (bromine or chlorine); salt of an alkali metal or an alkali earth metal having a pH of less than about 7; antimony; bismuth; or poly(tetrafluoroethylene). Preferably, the carbonate polymer composition according to the invention, in the form of test specimens having thickness of one sixteenth of an inch (1.6 millimeter) and one eighth of an inch (3.2 millimeter) have a UL-94 test rating of V-2.

In another embodiment, the present invention is a carbonate polymer composition as described above also comprising from about 0.001 to about 0.1 weight percent of an alkali metal salt having a pH of at least about 7 and an extruded sheet prepared from such a carbonate polymer composition.

The carbonate polymer resins ("PC's") according to the present invention desirably achieve Underwriters Laboratory (UL-94) V-2 ratings, preferably at thickness of both ⅛ inch and 1/16 inch, preferably also ¼ inch. Preferably these ratings are achieved with an injection molded sample, more preferably also with samples cut from extruded sheet structures.

It has been discovered that the addition of these low levels of aromatic phosphate ester compound, such as haloaryl phosphate, resorcinol diphenyl phosphate (RDP), alkylene diphenyl phosphate (ADP) or bisphenol-A diphenyl phosphate (BDP), to PC's, will promote sufficient dripping to remove the burning polymer from the part being tested to achieve the desired UL-94 V-2 rating. Surprising, this does not deteriorate the PC resin's combinations of thermal stability, toughness, processability, hydrolytic and chemical resistance, appearance and optical properties, and retention of the additives under melt processing conditions.

The carbonate polymer compositions of this invention are useful across a range of applications such as, for example, the production of films, fibers, extruded sheets, multi-layer laminates and molded or shaped articles of virtually all varieties, especially data storage apparatus, appliance and instrument housings, motor vehicle body panels and other parts and components for use in the automotive, electrical and electronics industries.

In another embodiment, the present invention is directed to the improved processes that use these resins to prepare molded or shaped articles, especially extruded sheet, and to the improved molded or shaped articles.

DETAILED DESCRIPTION

In general, the carbonate polymers for use in the compositions according to the present invention can be prepared from one or more multi-hydric compounds by reacting the multi-hydric compound(s) such as a dihydric phenol with a carbonate precursor. The carbonate precursors are well known and include phosgene, haloformates or carbonate esters such as diphenyl carbonate. Dihydric phenols are preferred multi-hydric compounds and produce an aromatic carbonate polymer, the most typical and preferred of the carbonate polymers. The dihydric phenols which are preferably employed to provide the aromatic carbonate polymers contain one or more aromatic rings and contain as functional groups two or more hydroxyl moieties which are reactive with the carbonate precursor compound, each of which hydroxyl moiety is preferably attached directly to a carbon atom of an aromatic ring.

Typical dihydric phenols are: (a) the bis(hydroxyphenyl) alkanes, such as 2,2-bis-(4-hydroxyphenyl)-propane ("Bisphenol A"), 2,2-bis-(4-hydroxyphenyl)-pentane, 2,4'-dihydroxy diphenyl methane, bis-(2-hydroxyphenyl) methane, bis-(4-hydroxyphenyl)-methane, 1,1-bis-(4-hydroxyphenyl)-ethane, 3,3-bis-(4-hydroxyphenyl)-pentane; (b) halogenated bis(hydroxyphenyl) alkanes such as 2,2-bis(3,5-dihalo-4-hydroxyphenyl)propane ("Tetrahalo Bisphenol-A") where the halogen can be fluorine, chlorine, bromine or iodine, such as for example 2,2-bis(3,5-dibromo-4-hydroxyphenyl)propane ("Tetrabromo Bisphenol-A" or "TBBA"); (c) alkylated bis(hydroxyphenyl)alkanes such as 2,2-bis(3,5-dialkyl-4-hydroxyphenyl)propane ("Tetraalkyl Bisphenol-A") where the alkyl can be methyl or ethyl, for example 2,2-bis(3,5-dimethyl-4-hydroxyphenyl)propane ("Tetramethyl Bisphenol-A"); (d) other ring-substituted bis (hydroxyphenyl)alkanes such as bis(4-hydroxy-5-nitrophenyl)-methane; (e) bis(hydroxyphenyl) aryl-substituted alkanes such as 1-bis(4-hydroxyphenyl)-1-phenyl ethane ("Bisphenol-AP" or "Bis-AP"), 9,9-bis(4-hydroxyphenyl) fluorene ("BHPF"); (f) bis(hydroxyphenyl) cycloalkanes such as 1,1-bis(4-hydroxyphenyl) cyclohexane; (g) dihydroxyphenyls such as hydroquinone and resorcinol; (h) the dihydroxydiphenyls such as 2,2'-dihydroxydiphenyl and 2,6-dihydroxy naphthalene; (i) the bis(hydroxyphenyl)-sulfones such as bis-(4-hydroxyphenyl) sulfone; 2,4'-dihydroxydiphenyl sulfone, 5'-chloro-2,4'-dihydroxydiphenyl sulfone, bis-(4-hydroxyphenyl) diphenyl disulfone, and (j) the dihdroxydiphenyl ethers such as 4,4'-dihydroxydiphenyl ether, 4,4'-dihydroxy-3,3'-dichloro diphenyl ether, and 4,4'-dihydroxy-2,5-diethoxydiphenyl ether. The preferred carbonate polymer process uses a dihydric phenol, preferably Bisphenol A, as the multi-hydric compound.

It is, of course, possible to employ two or more different multi-hydric compounds or a multi-hydric compound in combination with a glycol, a hydroxy terminated polyester, or a dibasic acid in the event a carbonate copolymer or polyestercarbonate (rather than a homopolycarbonate) is desired for use as the carbonate polymer in the preparation of the carbonate polymer compositions of the invention. Also included within the term "carbonate polymer" are the copolymers optionally prepared by incorporating into the polymerization reaction mixture a dicarboxylic acid, such as terephthalic acid or isophthalic acid (or an ester-forming derivative thereof), or a hydroxycarboxylic acid, from which a carbonate polymer containing ester bonds or segments is obtained. The ester precursor may be added to the reaction mixture as a monomer or as a separately-formed ester oligomer. An ester/carbonate copolymer may have, for example, about 15 to 90, preferably about 35 to 70, mole percent ester bonds. However, in a preferred embodiment, the carbonate polymer of this invention does not contain any ester bonds or segments. Also mixtures of various carbonate polymers may be employed although the carbonate polymer compositions according to this invention preferably comprise no further thermoplastic polymer resin component(s).

It is also possible to use randomly branched carbonate polymers in the compositions according to the present invention. In fact, due to their higher melt viscosities, randomly branched carbonate polymers are preferred for use in the preparation of some types of extruded sheet, particularly twin wall sheet where the melt viscosity needs to be as high as possible. As is known, randomly branched carbonate polymers are prepared by employing a multi-functional branching agent in the carbonate polymer that produces long chain branches in the molecule either during the polymerization or in a subsequent reaction.

A branched rather than linear polycarbonate molecule can be obtained by adding to the reaction mixture a tri- or polyfunctional monomer such as a tri- or tetrafunctional phenol or carboxylic acid (or derivative thereof such as an acyl halide or anhydride), or a nitrogen compound such as cyanuric chloride. Representative examples of such branching agents are trimellitic acid, pyromellitic dianhydride or trisphenoxy ethane (or derivative thereof such as an acyl halide or anhydride). A branching agent may be added to the reaction mixture before or after a dihydroxy compound is contacted with a carbonate precursor, and is typically used in an amount of about 0.001 to 0.30, preferably about 0.002 to about 0.20, and more preferably about 0.002 to about 0.15 mole per total mole of all dihydroxy compounds. It is also possible to employ a latent reactive moiety such as arylcyclobutene, ethenyl aromatic or (meth)acrylic moieties, that can be activated during subsequent melt processing to produce long chain branching in the carbonate polymer.

The molecular weight of a carbonate polymer is usually controlled by inclusion of a chain terminating compound in the polymerization process. As is known, the chain terminating compound is usually a monohydric compound or other monofunctional compound typically selected from the phenols, alcohols, amines, imides, carbonic acid chlorides, sulfonic acid chlorides, benzyltriethyl ammonium chloride, or phenylchlorocarbonates. Preferred chain terminating compounds are the monophenols such as phenol, para-tertiary butyl phenol, cumyl phenol or the like. A chain terminator may be added to the reaction mixture before or after a dihydroxy compound is contacted with a carbonate precursor, and is typically used in an amount of about 0.001 to 0.30, preferably about 0.01 to about 0.20, and more preferably about 0.01 to about 0.10 mole per total mole of all dihydroxy compounds.

As is known, many properties of carbonate polymer compositions are determined by the average molecular weight of the carbonate polymer. Unless otherwise indicated, the references to "molecular weight" (Mw) herein refer to weight average molecular weight as measured by gel permeation chromatography with a bisphenol A polycarbonate standard. The average molecular weight of carbonate polymers which are suited for use according to the present invention can vary in the range of from about 20,000 to about 40,000.

In general, in order to provide the desired melt viscosity properties in combination with optimizing other physical properties, these carbonate polymers have a weight average molecular weight of at least about 20,000, preferably at least about 22,000, more preferably at least about 25,000, and most preferably at least about 26,000. In the lower molecular weight ranges, the phosphate ester compound is not typically needed to obtain a V-2 rating unless the carbonate polymer contains a further additive or component such as a filler or impact modifier that reduces the dripping tendency of the polymer under flame contact conditions.

In order to keep the desired level of polymer melt flow and processability it has been found that the carbonate polymer component should have a weight average molecular weight of no more than about 40,000, preferably no more than about 38,000, more preferably no more than about 37,000, most preferably no more than about 36,000.

It is also possible to specify the desired carbonate polymers for use in the compositions according to the present invention in terms of their melt flow rate ("MFR") which is typically measured by ASTM Designation D 1238-89, Condition O, 300/1.2. As is known, the melt flow rate gives the amount of polymer in grams that flows through the apparatus in ten minutes (gr/10 min) under the specified condition, higher molecular weight polymers having higher melt viscosities corresponding to lower melt flow rates. To provide the desired melt viscosity properties, these carbonate polymers have a melt flow rate of no more than about 24 gr/10 min, preferably no more than about 22 gr/10 min, more preferably no more than about 15 gr/10 min.

In order to keep the desired level of polymer melt flow and processability it has been found that the carbonate polymer component should have a melt flow rate of at least about 2 gr/10 min, preferably at least about 3 gr/10 min, more preferably at least about 4 gr/10 min and most preferably at least about 5 gr/10 min.

The low volatility aromatic phosphate ester compounds which are used in this invention to prepare carbonate polymer compositions are generally known types of compounds and many are commercially available. It has been found that a range of these phosphate ester-type compounds are suitable depending primarily upon the required low volatility level. It is currently theorized that the low degree of volatility determines whether the compound volatilizes excessively from the polymer composition during the melt processing of the resin into articles (particularly into extruded sheet structures) and during the initial heating and melting of the polymer when an ignition source is applied and the polymer starts to burn. Since the specified very low levels of the phosphate ester compounds are critical to obtaining the V-2 rating without detrimentally affecting the other desired carbonate polymer properties, it is necessary to avoid the volatilization of any significant amount of the additive under typical melt processing or extrusion temperatures (on the order of 250° C.) and under the polymer melt temperature conditions experienced by the polymer at initial flame contact and combustion conditions (on the order of 300° C.).

In this regard, it has been found that suitable phosphate ester compounds experience a weight loss of no more than 5 weight percent, preferably no more than 3 weight percent when heated to a temperature of 250° C. in a thermogravimetric analysis (TGA) at a heating rate of 20° C. per minute. Desirably, the phosphate ester compounds experience a weight loss of no more than 20 percent, more preferably no more than 15 weight percent when heated to a temperature of 275° C. in a TGA. Preferably, the phosphate ester compounds experience a weight loss of no more than 40 percent, more preferably no more than 20 weight percent and most preferably no more than 10 weight percent when heated to a temperature of 300° C. in a TGA.

The phosphate ester compounds may be described generally as containing the moiety represented by structure as:

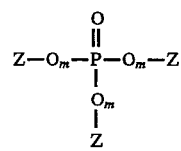

wherein independently, m is zero or 1, preferably 1; and each Z is independently selected from the group consisting of (i) $C_2$–$C_{20}$ linear, branched or cyclic alkyl radicals, (ii) $C_6$–$C_{30}$ aryl radicals having one or more aromatic nuclei, (iii) halogenated $C_6$–$C_{30}$ aryl radicals having one or more aromatic nuclei and having 1 to 5 halogen radicals, preferably bromine; and, (iv) in the case of oligomeric phosphate esters, additional phosphate ester units, preferably aromatic, that result in an oligomeric straight or branched chain phosphate ester.

Exemplary haloarylphosphophate ester compounds which are suitable for use according to the invention are generally known and commercially available. These compounds include tris (2,4)-dibromophenyl) phosphate, commercially available as Reoflam PB-460 brand phosphate compound from FMC Corp.; tris (4-bromophenyl) phosphate; dicresyl 4-bromophenyl phosphate; 2,4-dibromophenyl 2-ethylcresyl phosphate; 2,4-dibromophenyl methyl phosphate; and diethyl 4-bromophenyl phosphate. The preparation and use of these brominated phosphorous compounds is well known from U.S. Pat. Nos. 3,557,053; 4,033,927 and 4,710,530.

Exemplary oligomeric phosphate ester compounds are generally known and commercially available. See for example U.S. Pat. No. 5,204,394, which shows linear oligomeric aromatic phosphate ester compounds, and JP-A-62-25,706 (1987) which shows linear and branched oligomeric aromatic phosphate ester compounds, both of which are incorporated herein by reference. Preferred compounds include oligomeric resorcinol diphenyl phosphate (RDP) such as commercially available Fyroflex brand RDP from Akzo/Nobel Chemical Company, oligomeric bisphenol A diphenol phosphate (BDP) and oligomeric alkylene diphenyl phosphate (ADP).

The linear oligomeric phosphate ester compounds are generally represented by the formula:

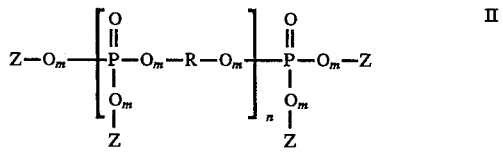

wherein R is independently a divalent $C_1$–$C_{20}$ linear, branched or cyclic alkylene or alkylidene radical, or a divalent $C_6$–$C_{30}$ arylene radical having one or more aromatic nuclei, or a substituted derivative of any of same; Z is independently selected from the group of (i) monovalent $C_1$–$C_{20}$ linear, branched or cyclic alkylene or alkylidene radical, (ii) monovalent $C_6$–$C_{30}$ arylene radicals having one or more aromatic nuclei or (ii) substituted derivatives of any of same such as haloaryl groups or (iii) a hydrogen radical; each m is independently zero or 1, preferably 1; and n is from about 1 to about 10 (inclusive), or any subset thereof, preferably from about 1 to about 7, more preferably from about 1 to about 3. As recognized by the skilled practitioner, n can represent the average number of repeating units for an aromatic phosphate ester oligomer where the aromatic phosphate ester oligomer composition contains a statistical distribution of phosphate compounds as typically results from an oligomerization process. As a result, n need not be a whole number for a particular aromatic phosphate ester oligomer composition.

In the case where the phosphate ester compound is a branched, oligomeric phosphate, these compounds are represented by a formula generally similar to formula II above provided that in some occurrences Z is replaced by further phosphate ester moieties, optionally linked to one or more further phosphate ester moiety.

Representative mono- or di-valent arylene radicals in R and Z are based on and include phenylene, biphenylene, 2,2-diphenyl propane, naphthenylene, anthracenylene, and substituted derivatives thereof, and the like. Preferred arylene radicals from which R or Z may be derived include the remnants of resorcinol, 1-bis(4-hydroxyphenyl)-1-phenyl ethane ("Bisphenol-AP" or "Bis-AP"), 9,9-bis(4-hydroxyphenyl) fluorene ("BHPF") or Bisphenol A. In a preferred aspect of the present invention R is selected from the group consisting of a divalent $C_2$–$C_{20}$ linear, branched or cyclic alkylene or alkylidene radical, or a divalent $C_6$–$C_{30}$ arylene radical having one or more aromatic nuclei, or a substituted derivative of any of same; Z is a monovalent $C_6$ arylene radical, each m is 1, and n is from about 1 to about 3.

As is known these compounds may be prepared by a condensation reaction of phosphorus oxychloride, an aromatic hydroxy compound, an aromatic dihydroxy compound, and/or an aliphatic alcohol or diol (depending on the choice made as to the identity of R and Z) in a dry, inert solvent (such as methylene chloride or pyridine) in the presence of aluminum chloride as a catalyst. Further details of the preparation of various of these phosphate compounds are set forth in JP 59-45,351-A (1984) and JP 59-202,240-A (1984) which are incorporated herein.

The compositions of this invention are those in which an aromatic phosphate ester compound and optional alkali metal salt have been admixed in a carbonate polymer. In general, to provide sufficient combinations of dripping and flame self-extinguishment to obtain the V-2 rating, the aromatic phosphate ester compound component should be incorporated in the compositions according to this invention in amounts of greater than about 0.1, preferably at least about 0.2, more preferably at least about 0.3, and most preferably at least about 0.4 weight percent, expressed in percent by weight based on the total composition. On the other hand, to maintain the V-2 rating and to optimize the composition in terms of cost and the balance of other physical properties, it has been found that the aromatic phosphate ester compound component should be incorporated in the compositions according to this invention in amounts of less than 1 percent, preferably no more than about 0.9, preferably about 0.8, and most preferably about 0.7 percent by weight of the total composition.

In testing the resins according to this invention, it was surprisingly found that the UL-94 ratings achievable in injection molded samples were not consistently achievable in samples that were cut from extruded sheet structures ("sheet samples"). It was found that sheet samples cut in both machine and transverse directions would not uniformly achieve a UL-94 V-2 rating even though injection molded samples would be V-2 rated and it is theorized that this is due to differing degrees and directions of orientation.

In further studies to achieve V-2 rating in both sheet and injection molded samples a range of further additives was evaluated. It was determined that addition of an alkali metal salt having a pH of at least about 7 in amounts of from about 0.001 to about 0.1 weight percent provides V-2 rating in both sheet and injection molded samples.

Examples of alkali metal salts having a pH of at least about 7 include the sodium and potassium salts of sulfimides, saccharin and phthalimides. In particular, it has been found that if the pH is less than about 7, such as in the case of typically used salts such as the potassium salt of a perfluorobutane sulfonic acid or potassium diphenyl sulfone sulfonate, V-2 rating is not obtained using equivalent levels of the salt in sheet or injection molded samples.

The preferred alkali metal salts are salts of aromatic sulfur compounds including alkali metal salts of aromatic sulfonates, aromatic sulfates, aromatic sulfonamides, and aromatic sulfimides having a pH of at least about 7. Suitable metals are the alkali metals such as sodium or potassium. The preferred alkali metal salts of aromatic sulfur compounds used herein are further illustrated by the formula:

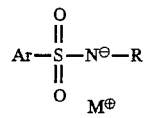

wherein Ar is an aromatic group, preferably tolyl; M is an alkali metal cation, preferably sodium or potassium; R is carbonyl, arylcarbonyl, arylaminocarbonyl, aralkkylaminocarbonyl, or arylsulfonyl. Specific examples of these R groups are benzoyl, benzylaminocarbonyl and tolylsulfonyl groups.

The most preferred group of aromatic sulfur compounds are sulfimides having the formula:

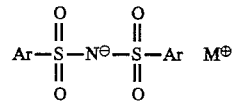

wherein Ar is an aromatic group, preferably tolyl, and M is a metal cation, preferably sodium or potassium.

Examples of the sulfimide salts are the alkali metal salts of saccharin, N-(p-tolylsulfonyl)-p-toluene sulfimide, N-(N'-benzylaminocarbonyl)sulfamilimide, N-(phenylcarboxyl)-sulfanilimide, N-(2-pyrimidinyl)-sulfanilimide, and (N-2-thiazolyl)sulfanilimide. These and similar salts are disclosed in U.S. Pat. No. 4,254,015 which is incorporated herein by reference.

As is known in the art, the pH of alkali metal salts can be adjusted and optimized to the desired level by the reactant stoichiometry and by the recovery, washing and purification steps employed. The alkali metal salt pH is selected to be high enough to provide the desired amount of char formation but not so high as to degrade the carbonate polymer. Although not limiting the scope of the invention, it has been theorized that the acidity of the aromatic phosphate ester compound can provide a stabilizing or buffering effect for the alkali metal salt if the more basic alkali metal salts are used. The alkali metal salt pH is preferably at least about 7, more preferably at least about 7.5 and most preferably at least about 8. In general, alkali metal salt pH should less than about 11, more preferably less than about 10, more preferably less than about 9 and most preferably less than about 8.5.

In general, the alkali metal salt having a pH of at least about 7 is employed in amounts to improve the ignition resistance of the blend composition and maintain as much as possible the desired physical properties. The salt is typically incorporated into the blend of the present invention in amounts of at least about 0.001 weight percent, preferably at least about 0.005 weight percent and most preferably at least about 0.01 weight percent based on the weight of all of the composition components (carbonate polymer and aromatic phosphate esters). In order to maintain the resin blend physical properties and reduce cost, alkali metal salt is typically incorporated into the blend of the present invention in amounts up to and including about 0.1 weight percent, preferably in amounts up to and including about 0.08 weight percent and most preferably in amounts up to and including about 0.05 weight percent based on total weight of all of the composition components.

Preparation of the compositions of this invention can be accomplished by any suitable mixing means known in the art. Typically the components and any optional additives are dry blended in a tumbler or shaker in powder or particulate form with sufficient agitation to obtain thorough distribution thereof. If desired, the dry-blended formulation can further be subjected to shearing stresses at a temperature sufficient to heat soften and melt mix the polymer, for example in an extruder with or without a vacuum. Other apparatus which can be used in the mixing process include, for example, a roller mill, a Henschel mixer, a ribbon blender, a Banbury mixer, or a reciprocating screw injection molding machine. The components may be mixed simultaneously or in any sequence. After mixing, the compositions may be recovered in the form of a pellet, powder or flake.

When softened or melted by the application of heat, the compositions of this invention are useful for fabrication and can thereby be formed or molded using conventional techniques such as compression molding, injection molding, gas assisted injection molding, calendering, vacuum forming, thermoforming, extrusion and/or blow molding techniques, alone or in combination. The compositions can also be formed, spun or drawn into films, fibers, multi-layer laminates or extruded sheets, or can be compounded with one or more organic or inorganic additives, on any machine suitable for such purpose.

To maintain optimum combinations of the cost and properties at the V-2 UL-94 rating, the compositions of this invention preferably do not contain any additional amounts of other known ignition resistance additives based on halogen; alkali metal salt or alkali earth metal salt having a pH less than about 7; antimony; bismuth or poly (tetrafluoroethylene). This recognizes, of course, that minute but detectable amounts of chlorine or other production process impurities or byproducts may be found in the carbonate polymer. For example, in a particular alternative embodiment, the compositions of this invention containing a low volatility phosphate composition and optional alkali metal salt having a pH of at least about 7 as prescribed above, do not contain any further ignition resistance additive (s) based on a halogen such as fluorine, chlorine or bromine; a salt of an alkali metal or an alkali earth metal having a pH of less than about 7; antimony; bismuth; poly (tetrafluoroethylene or the like.

Preferably the carbonate polymer compositions according to this invention comprising no further thermoplastic polymer resin component(s) although a variety of other types of additives not adversely affected the desired property combinations may be advantageously used in the compositions of this invention for other purposes such as antimicrobial agents such as organometallics, isothtazolones, organosulfurs and mercaptans; antioxidants such as phenolics, hindered phenolics, secondary a mines, phosphites, phosphonites, diphosphonites and thioesters; antistatic agents such as quaternary ammonium compounds, amines, and ethoxylated, propoxylated or glycerol compounds; fillers and reinforcing agents such as talc, clay, mica, silica, quartz, kaolin, aluminum nitride, TiO2, calcium sulfate, $B_2O_3$, alumina, glass flakes, beads, whiskers or filaments, nickel powder and metal or graphite fibers; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers such as a hindered amine, an o-hydroxy-phenylbenzotriazole, a dimeric benzotriazole, a 2-hydroxy, 4-alkoxybenzophenone, a salicylate, a cyanoacrylate, a nickel chelate and a benzylidene malonate and oxalanilide. Such additives, if used, are used in their typical amounts and do not exceed 45 percent by weight of the total composition, and, if used, most are typically used only in amounts of from about 0.001 to about 15 percent, preferably not more than about 10 percent, more preferably not more than about 5 percent and more preferably not more than about 3 percent by weight of the total composition, depending upon the type of additive.

As used herein, it is understood that terms such as ignition resistant or flame retardant, or of ratings or other numerical values derived from tests related to burning or the application of a flame, are not intended to reflect hazards presented by the disclosed carbonate polymer compositions or any other material under actual fire conditions. As used herein and recognized by the practitioner in this field, the terms "ignition resistance" or "ignition resistance additives" may include or induce the situation where the molten, flaming polymer portion drips off the test part under burning conditions and the test part thereby stop burning.

EXPERIMENTAL AND CONTROL COMPOSITIONS

Experimental and Control Compositions 1–3 and 9–14; Oligomeric Phosphate Esters A phosphate ester/carbonate polymer master batch is initially prepared by adding 4 weight parts of the oligomeric aromatic phosphate ester to 96 weight parts ground polycarbonate having a molecular weight of 35,000 and resulting in an oligomeric phosphate ester level of about 4% in the additive master batch. The PC/oligomeric phosphate ester master batch together with a benzotriazole ultraviolet (UV) stabilizer, a diphosphonite antioxidant and epoxidized soybean oil (ESO) tackifier are combined with a polycarbonate resin. The polycarbonate resin used was a linear polycarbonate prepared from bisphenol A and phosgene having a weight average molecular weight of about 35,000 and a melt flow rate ("MFR") of 5 grams per 10 minutes (5 gr/10 min) commercially available from The Dow Chemical Company.

The PC/oligomeric phosphate ester master batch is added in amounts needed to prepare the compositions indicated in the following tables, for example in an amount of about 10 weight parts master batch per 90 weight parts polycarbonate to provide a level of 0.4 weight percent oligomeric phosphate ester in the resultant polycarbonate resin. The UV stabilizer is added in an amount to provide 0.15 wt % in the resultant polycarbonate resin. The antioxidant is added in an amount to provide 0.08 wt % in the resultant polycarbonate resin. The ESO is added in an amount to provide 0.05 wt % in the resultant polycarbonate resin. The specific oligomeric phosphate esters are identified below and the Experimental Compositions are summarized in the below tables.

The measured ingredients were tumble blended for about 5 minutes. The uniformly blended material was extruded into pellets on 30 mm Werner Pfleiderer extruder at 275° C. barrel temperature. The extruded pellets were dried in an air draft oven at 110° C. for at least 3 hours. The dried pellets were injection molded on an Arburg molding machine at 300° C. into test bars for evaluation.

The notched Izod impact resistance ("N. Izod") is tested at room temperature according to ASTM D-256-72A on 3.2 millimeter (⅛ inch) samples that have been injection molded at 307° C. The results are given in Joules per meter (J/m) and foot pounds per inch (ft lb/in). The Underwriters Laboratory UL-94 (UL-94) evaluation as more fully described above is performed on molded part test specimens of ⅛ inch (0.125 inch or 3.2 mm) and 1/16 inch (0.0625 inch or 1.6 mm) to determine whether they obtain the V-2 rating (V-2) or not (fail).

In addition to showing whether or not the V-2 rating is obtained, the table below reports the findings from several components of the test including: "Total burn time (sec)", the total burn time in seconds for the 5 samples that were evaluated for each composition; "Longest burn time (sec)", the longest time that any particular sample burned before extinguishing; "Drip T-1" and "Drip T-2", whether the sample dripped during the first or second burning period.

The optical properties were also tested by the indicated methods. The yellowness index ("YI") was measured by ASTM D-1003. The percentage of light transmitted through the sample (% Transmittance) and percentage haze (% Haze) in the samples were measured by Hunter Lab Color Quest machine. The melt flow rate (MFR) for the samples was measured by ASTM Designation D 1238-89, Condition O (300/1.2) and is reported in grams per 10 minutes (gm/10 min). The heat resistance was measured as the distortion temperature under load (DTUL) according to ASTM D-648 at 264 pounds per square inch (psi) of load (1.8 MPa) and is reported in °F. and °C. The materials were also tested for their heat stability during relatively high temperature injection molding ("MOLDING AT 415° C.") and it is reported whether or not "splay" or "bubbles" were observed. As is known, "splay" is caused by the entrapment of very small bubbles in molded parts that result if gas is either present in the polymer or evolved during the high temperature molding step.

Oligomeric Phosphate Esters

Resorcinol Diphenyl Phosphate (RDP)

The oligomeric phosphate ester was resorcinol diphenyl phosphate (RDP) having a molecular weight of about 640 in form of a liquid obtained from Akzo/Nobel and having the following structure:

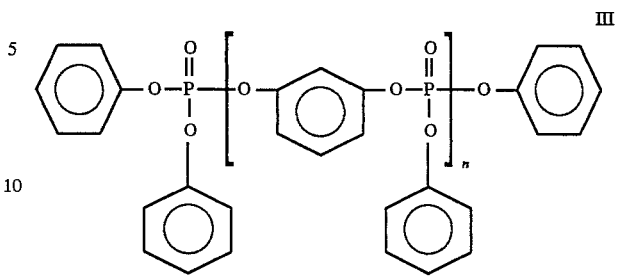

where n ranges from 1 to 7 and has an average value of about 1.3, and the dimer (n=1) content is 65%.

Bisphenol-A Diphenyl Phosphate (BDP)

The oligomeric phosphate ester was bisphenol-A diphenyl phosphate (BDP) having a molecular weight of about 790 in form of a liquid obtained from Akzo/Nobel and having the following structure:

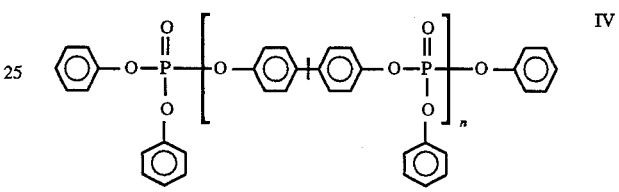

where n ranges from 1 to 4 and has an average value of about 1.1, and the dimer (n=1) content is 80%.

Alkylene Diphenyl Phosphate (ADP)

The procedure for the Experimental Compositions was repeated except that the oligomeric phosphate ester was alkylene diphenyl phosphate (ADP) having a molecular weight of about 568 in form of a liquid obtained from Akzo/Nobel and having the following structure:

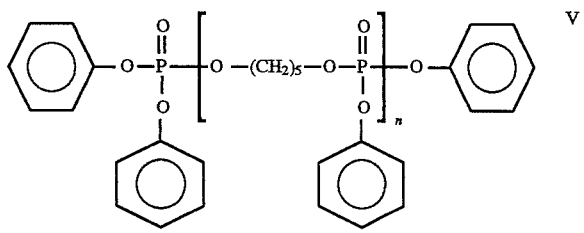

Control Composition 4—Triphenyl Phosphate (TPP)

The procedure for the Experimental Compositions was repeated except that a volatile, monomeric phosphate ester, triphenyl phosphate (TPP), was used having a molecular weight of about 326 in form of a flake obtained from Akzo/Nobel and having the following structure:

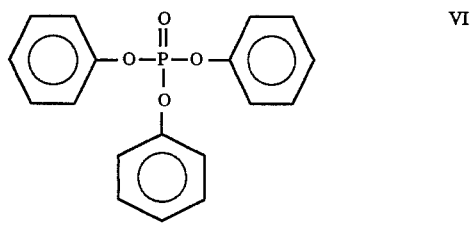

Control Compositions 5–8—No Phosphate Ester

The procedure for the Experimental Compositions was repeated except that no oligomeric phosphate ester was added and the polycarbonate resin compositions contained only the indicated levels of other additives or were re-extruded and injection molded without any additives.

The levels of the ingredients in each of the formulations are shown in Tables 1 and 2. It should be noted that any numerical values derived from tests related to burning or the application of a flame, are not intended to reflect hazards presented by the disclosed carbonate polymer compositions or any other material under actual fire conditions.

TABLE 1

EFFECT OF OLIGOMERIC PHOSPHATE ESTER TYPE

| Composition No. | 1 | 2 | 3 | *4 | *5 | *6 |
|---|---|---|---|---|---|---|
| RDP | 0.40 | | | | | |
| BDP | | 0.40 | | | | |
| ADP | | | 0.40 | | | |
| TPP | | | | 0.40 | | |
| UV | 0.15 | 0.15 | 0.15 | 0.15 | 0.15 | |
| Antioxidant | 0.08 | 0.08 | 0.08 | 0.08 | 0.08 | |
| ESO | 0.05 | 0.05 | 0.05 | 0.05 | 0.05 | |
| 5 MFR PC | 99.32 | 99.32 | 99.32 | 99.32 | 99.72 | 100 |
| Properties | | | | | | |
| UL-94 Rating 1/8" (3.2 mm) | V-2 | V-2 | V-2 | Fail | Fail | Fail |
| Total burn time (sec) | 86 | 141 | 207 | 285 | 254 | 286 |
| Longest burn time (sec) | 18 | 25 | 28 | 146 | 58 | 67 |
| Drip T-1 | NO | NO | YES | YES | YES | YES |
| Drip T-2 | YES | YES | YES | YES | YES | YES |
| UL-94 Rating 1/16" (1.6 mm) | V-2 | V-2 | V-2 | Fail | Fail | Fail |
| Total burn time (sec) | 93.3 | 101.1 | 103 | 155 | 232 | 307 |
| Longest burn time (sec) | 13 | 17.1 | 20 | 47 | 93 | 76 |
| Drip T-1 | YES | YES | YES | YES | YES | YES |
| Drip T-2 | YES | YES | YES | YES | YES | YES |
| Optical Properties | | | | | | |
| Yellowness Index (YI) | 3.6 | 3.9 | 3.6 | | 3.41 | 2.75 |
| % Transmittance (%T) | 89.9 | 89.9 | 90.6 | | 90.6 | 90.8 |
| % Haze (%H) | 1.1 | 0.8 | 1.3 | | 1.3 | 0.82 |
| Melt flow rate (gm/10 min) | 4.5 | 4.6 | 5.7 | | 5.7 | 4.8 |
| N. izod (Joule/m) | 973 | 1011 | 1064 | | 1064 | 957 |
| (ft-lb/in) | 18.2 | 18.9 | 19.4 | | 19.4 | 17.4 |
| DTUL °C. (1.8 Mpa) | 127 | 125 | 125 | | 126 | 127 |
| DTUL °F. (264 psi) | 264 | 257 | 257 | | 259 | 263 |
| MOLDING AT 415° C. | NO SPLAY | NO SPLAY | SPLAY 390° C. | | | |

*Control Composition - not an example according to the present invention

TABLE 2

EFFECT OF PHOSPHATE ESTER AMOUNT

| | 7* | 8* | 9* | 10 | 11 | 12 | 13 | 14 |
|---|---|---|---|---|---|---|---|---|
| 5 MFR PC | 100 | 99.72 | 99.62 | 99.52 | 99.42 | 99.32 | 99.22 | 99.6 |
| UV | | 0.15 | 0.15 | 0.15 | 0.15 | 0.15 | 0.15 | |
| Antioxidant | | 0.08 | 0.08 | 0.08 | 0.08 | 0.08 | 0.08 | |
| ESO | | 0.05 | 0.05 | 0.05 | 0.05 | 0.05 | 0.05 | |
| RDP | | | 0.1 | 0.2 | 0.3 | 0.4 | 0.5 | 0.4 |
| PROPERTIES | | | | | | | | |
| MFR AT 300° C. 1.5 kg | 4.5 | 4.9 | 5.3 | 5.4 | 5.5 | 5.6 | 5.4 | 4.9 |
| OPTICAL PROPERTIES | | | | | | | | |
| YI | | | 3.8 | 3.7 | 3.9 | 3.4 | 3.7 | 2.6 |
| % TRANSMISSION | | | 90 | 90 | 90 | 90 | 90 | 90 |
| HAZE | | | 1.28 | 1.42 | 1.13 | 1.00 | 0.96 | 0.79 |
| DTUL °F. (264 psi) | 275 | | 266 | 266 | 266 | 266 | 266 | 266 |
| °C. (1.8 MPa) | 135 | | 130 | 130 | 130 | 130 | 130 | 130 |
| IZOD(room temp.) | | | | | | | | |
| (ft-lb/in) | 18.3 | | 17.5 | 17.6 | 17.6 | 17.7 | 17.8 | 18.1 |
| (Joule/meter) | 979 | | 936 | 941 | 941 | 947 | 952 | 968 |
| UL-94 1/8" (3.2 mm) | V-2 | Fail | Fail | Fail | Fail | V-2 | V-2 | V-2 |
| TOTAL BURN TIME(SEC) | 97.1 | 171.6 | 135.1 | 226.7 | 156.4 | 106 | 88 | 80.8 |
| LONG BURN TIME(SEC) | 17.9 | 36.1 | 36.5 | 45.9 | 33.7 | 29.4 | 17.4 | 17.9 |

TABLE 2-continued

EFFECT OF PHOSPHATE ESTER AMOUNT

|  | 7* | 8* | 9* | 10 | 11 | 12 | 13 | 14 |
|---|---|---|---|---|---|---|---|---|
| T1 DRIP | YES | YES | YES | YES | YES | YES | NO | NO |
| T2 dRIP | YES | YES | YES | YES | YES | YES | YES | YES |
| UL-94 1/16" (1.6 mm) | Fail | Fail | Fail | V-2 | V-2 | V-2 | V-2 | V-2 |
| TOTAL BURN TIME(SEC) | 208 | 141.8 | 120 | 134.8 | 102.6 | 91.3 | 122.5 | 99.1 |
| LONG BURN TIME(SEC) | 72.7 | 32.8 | 39.7 | 25.3 | 15.9 | 16.7 | 26.5 | 28.4 |
| T1 DRIP | YES | YES | YES | YES | YES | YES | YES | YES |
| T2 DRIP | YES | YES | YES | YES | YES | YES | YES | YES |

*Control Composition - not an example according to the present invention

Experimental and Control Compositions 15–17—
Haloaryl Phosphate Esters

Haloaryl phosphate ester/carbonate polymer composition were prepared by adding the indicated amounts (0.5, 0.3 and 0.1 weight percentages) of the haloaryl phosphate ester; 0.15 weight percent benzotriazole ultraviolet (UV) stabilizer; 0.08 weight percent diphosphonite antioxidant; and 0.05 weight percent epoxidized soybean oil (ESO) tackifier are combined with the polycarbonate resin used in the above experiments. The haloaryl phosphate ester was Reoflam PB-460 (PB-460) having a molecular weight of about 818 in form of a powder obtained from FMC Corp. and having the following structure:

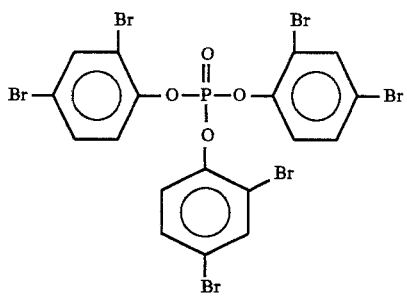

VII

The PC/phosphate ester composition was tumble blended for about 5 minutes and extruded into pellets on 30 mm Werner Pfleiderer extruder at 275° C. barrel temperature. The extruded pellets were dried in an air draft oven at 110° C. for at least 3 hours. The dried pellets were injection molded on an Arburg molding machine at 300° C. into test bars for evaluation.

Control Compositions 18–19—No Phosphate Ester

The procedure for the Experimental Compositions was repeated except that no phosphate ester was added and the polycarbonate resin compositions contained only the indicated levels of other additives or were re-extruded and molded without any additives.

The levels of the ingredients in each of the formulations are shown in Table 3 as are the evaluation results according to the evaluation techniques described above. It should be noted that any numerical values derived from tests related to burning or the application of a flame, are not intended to reflect hazards presented by the disclosed carbonate polymer compositions or any other material under actual fire conditions.

TABLE 3

EFFECT OF HALOARYL PHOSPHATE ESTER

| Composition No. | 15 | 16 | *17 | *18 | *19 |
|---|---|---|---|---|---|
| PB-460 | 0.5 | 0.3 | 0.1 |  |  |
| UV | 0.15 | 0.15 | 0.15 | 0.15 |  |
| Antioxidant | 0.08 | 0.08 | 0.08 | 0.08 |  |
| ESO | 0.05 | 0.05 | 0.05 | 0.05 |  |
| 5 MFR PC | 99.32 | 99.32 | 99.32 | 99.72 | 100 |
| Properties |  |  |  |  |  |
| UL-94 Rating 1/8" (3.2 mm) | V-2 | V-2 | Fail | Fail | Fail |
| Total burn time (sec) | 82 | 120 | 88 | 77 | 286 |
| Longest burn time (sec) | 15 | 30 | 32 | 35 | 67 |
| Drip T-1 | Yes | Yes | Yes | Yes | Yes |
| Drip T-2 | Yes | Yes | Yes | Yes | Yes |
| UL-94 Rating 1/16" (1.6 mm) | V-2 | Fail | Fail | Fail | Fail |
| Total burn time (sec) | 82 | 176 | 250 | 150 | 307 |
| Longest burn time (sec) | 14 | 52 | 88 | 44 | 76 |
| Drip T-1 | Yes | Yes | Yes | Yes | Yes |
| Drip T-2 | Yes | Yes | Yes | Yes | Yes |
| Optical Properties |  |  |  |  |  |
| Yellowness Index (YI) | 3.6 | 3.4 | 3.6 | 3.41 | 2.75 |
| % Transmittance (%T) | 90.0 | 90.0 | 90.5 | 90.6 | 90.8 |
| % Haze (%H) | 1.3 | 1.2 | 1.0 | 1.3 | 0.82 |
| N. Izod (Joule/m) | 947 | 963 | 957 |  |  |
| (ft-lb/in) | 17.7 | 18 | 17.9 |  |  |
| DTUL °C. (1.8 MPa) | 127 | 127 | 127 |  |  |
| DTUL °F. (264 psi) | 264 | 264 | 264 |  |  |

*Control Composition - not an example according to the present invention

Thermogravimetric Analysis of Phosphate Esters

By known thermogravimetric analytical techniques in a DuPont brand Thermogravimetric Analyzer the volatility of several phosphate esters was evaluated. The samples were heated from room temperature to 500° C. at a rate of 20° C. per minute. As can be seen, the suitable ester compounds exhibit low volatility.

TABLE 4

PHOSPHATE ESTER VOLATILITY

| Material | Wt Loss @ 250° C. | Wt Loss @ 275° C. | Wt Loss @ 300° C. |
|---|---|---|---|
| ADP | 0.4 | 0.9 | 1.2 |
| RDP | 0.6 | 0.7 | 1.3 |
| BDP | 1.1 | 1.4 | 1.7 |
| TPP* | 10 | 21 | 52 |

*Control Composition - not suitable for use in compositions according to the present invention Experimental and Control Compositions 20 through 27—Effect of Certain Alkali Metal Salts A phosphate ester/alkali metal salt/carbonate polymer master batch is initially prepared by adding 4 weight parts of the oligomeric aromatic phosphate ester and 0.05 weight parts of the alkali metal salt to 96 weight parts ground polycarbonate having a molecular weight of 35,000 and resulting in the additive master batch having an oligomeric phosphate ester level of about 4% and an alkali metal salt level of about 0.05 weight percent. The additive master batch together with a benzotriazole ultraviolet (UV) stabilizer, a diphosphonite antioxidant and epoxidized soybean oil (ESO) tackifier are combined with a polycarbonate resin. The polycarbonate resin used was a linear polycarbonate prepared from bisphenol A and phosgene having a weight average molecular weight of about 35,000 and a melt flow rate ("MFR") of 4.5 grams per 10 minutes (4.5 gr/10 min) commercially available from The Dow Chemical Company.

The PC/additive master batch is added in amounts needed to prepare the compositions indicated in the following tables, for example in an amount of about 10 weight parts master batch per 90 weight parts polycarbonate to provide levels of 0.4 weight percent oligomeric phosphate ester and 0.005 weight percent alkali metal salt in the resultant polycarbonate resin. The UV stabilizer is added in an amount to provide 0.15 wt % in the resultant polycarbonate resin. The antioxidant is added in an amount to provide 0.08 wt % in the resultant polycarbonate resin. The ESO is added in an amount to provide 0.05 wt % in the resultant polycarbonate resin. The specific oligomeric phosphate esters are identified above, the specific alkali metal salts are identified below and the Experimental Compositions are summarized in the below tables.

The following alkali metal salts were used in the indicated compositions. Potassium para tolyl sulfimide (KPTSM) is represented by the following structure:

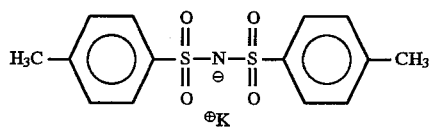

and has a pH of about 8.

Potassium diphenyl sulfone sulfonate (KSS) is represented by the following structure:

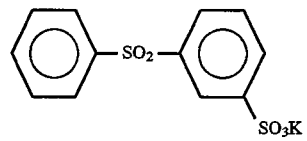

has a pH value of about 6 and is commercially available from Seal Sands Chemical, Ltd, England.

Potassium perfluorobutane sulfonate (KPFBS) is represented by the following structure:

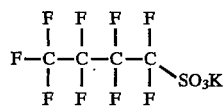

has a pH value of about 5 and is commercially available as Levagard C4 from Bayer.

The measured ingredients were tumble blended for about 5 minutes. The uniformly blended material was extruded into pellets on 30 mm Werner Pfleiderer extruder at 275° C. barrel temperature. The extruded pellets were dried in an air draft oven at 110° C. for at least 3 hours.

The dried pellets were injection molded on an Arburg molding machine at 300° C. into test bars for the injection molding evaluation shown in Table 5 below.

TABLE 5

UL-94 BURN TESTS OF INJECTION MOLDED SAMPLES CONTAINING VARIOUS ALKALI METAL SALTS

| Composition No. | 20 | 21 | 22* | 23* | 24* | 25* |
|---|---|---|---|---|---|---|
| Material Wt % | | | | | | |
| PC-4.5 | 99.32 | 99.32 | 99.32 | 99.32 | 99.32 | 99.32 |
| KPTSM | 0.005 | 0.005 | | | | |
| KPFBS | | | 0.005 | 0.005 | | |
| KSS | | | | | 0.005 | 0.005 |
| PB-460 | 0.4 | | 0.4 | | 0.4 | |
| RDP | | 0.4 | | 0.4 | | 0.4 |
| WT % TOTAL | 100 | 100 | 100 | 100 | 100 | 100 |
| UL-94 Test Results 1/16" Thick (1.6 mm) | | | | | | |
| Total T1 (Sec) | 59.9 | 56.1 | 126 | 95.4 | 133.6 | 111 |
| Avg. T1 (Sec) | 12 | 11.2 | 25.2 | 19.1 | 26.2 | 22.2 |
| Flaming Drips | Yes | Yes | Yes | Yes | Yes | Yes |
| Total T2 (Sec) | 24.6 | 22.6 | >29 | 25.3 | 15.1 | 15.9 |
| Avg. T2 (Sec) | 2.9 | 4.5 | >7.3 | 5.1 | 3 | 3.2 |
| Flaming Drips | Yes | Yes | Yes | Yes | Yes | Yes |
| Longest T (Sec) | 16.2 | 14.9 | >40 | 41 | 46.1 | 60.6 |
| Total T1 + T1 (Sec) | 84.5 | 78.7 | 155 | 120.7 | 148.7 | 126.9 |
| V2-Rating | Pass | Pass | Fail | Fail | Fail | Fail |
| 1/8" Thick (3.2 mm) | | | | | | |
| Total T1 (Sec) | 17.4 | 10.8 | | | | |
| Avg. T1 (Sec) | 3.5 | 2.2 | | | | |
| Flaming Drips | No | No | | | | |
| Total T2 (Sec) | 40.6 | 39.3 | | | | |
| Avg. T2 (Sec) | 8.1 | 7.9 | | | | |
| Flaming Drips | Yes | Yes | | | | |
| Longest T (Sec) | 12.3 | 11.6 | | | | |
| Total T1 + T1 (Sec) | 58 | 50.1 | | | | |
| V2-Rating | Pass | Pass | | | | |

*Control Composition not an example of the present invention

The sheet samples were prepared by initially extruding 12 inch (305 mm) square sheet samples from the pellets in a 2 inch (51 mm) single screw Killion brand extruder with a 32:1 L/D single stage screw. Prior to extrusion the pellets were dried at least 4 hours at 250° F. (121° C.). The extruder zone temperatures ranged from 280° C. to 290° C. and supplied the polymer to a standard sheet extrusion die 14 inches (357 mm) in width. The die lip spacing was set at 0.125 inch (3.175 mm). The extruded sheet is then passed through a vertical stack of 3 rolls where it is drawn down to a width of 12 inches (305 mm) and a thickness of 0.118 inch (3 mm), the roll temperatures being: top roll 250° F. (121° C.); middle roll 260° F. (127° C.) and bottom roll 320° F. (160° C.). The sheet was cut to lengths of 12 inches (305 mm) and test bars were then cut out of the sheets to the appropriate UL dimensions for the tests shown in Table 6 below.

TABLE 6

UL-94 BURN TESTS OF 0.118" (3 mm) SHEET SAMPLES

| Composition No. | 26 | 27* |
|---|---|---|
| Material Wt % | | |
| PC-4.5 | 99.32 | 99.325 |
| KPTSM | 0.005 | |
| RDP | 0.4 | 0.4 |

TABLE 6-continued

UL-94 BURN TESTS OF 0.118" (3 mm) SHEET SAMPLES

| Composition No. | 26 | 27* |
|---|---|---|
| TOTAL WT % | 100 | 100 |
| UL-94 Test Results | | |
| Total T1 Sec | 20 | 121.8 |
| Avg. T1 Sec | 4 | 24.4 |
| Flaming Drip | No | Yes |
| Total T2 (Sec) | 52.5 | 91.4 |
| Avg. T2 (Sec) | 10.5 | 18.3 |
| Flaming Drip | Yes | Yes |
| Longest T (Sec) | 14.1 | 63.9 |
| Total T1 + T1 (Sec) | 72.5 | 213.2 |
| V2-Rating | Pass | Fail |

*Control Composition - not an example of the present invention

What is claimed is:

1. A carbonate polymer composition consisting essentially of (a) a carbonate polymer having a weight average molecular weight of from about 20,000 to about 40,000 and ignition resistance additives consisting essentially of (b) from greater than about 0.1 to less than about 1.0 weight percent (based on carbonate polymer composition weight) low volatility aromatic phosphate ester compound, and optionally from about 0.001 to about 0.1 weight percent (based on carbonate polymer composition weight) of (c) an alkali metal salt having a pH of at least about 7.

2. A carbonate polymer composition according to claim 1 wherein the low volatility aromatic phosphate ester is selected from the group of aromatic phosphate ester oligomer compounds or haloaryl phosphate compounds.

3. A carbonate polymer composition according to claim 1 wherein the low volatility aromatic phosphate ester is selected from the group of aromatic phosphate ester oligomer compounds or haloaryl phosphate compounds which experience a weight loss of no more than 5 weight percent at 250° C. when heated to a temperature of 500° C. in a thermogravimetric analysis (TGA) at a heating rate of 20° C. per minute.

4. A carbonate polymer composition according to claim 1 wherein the low volatility aromatic phosphate ester is selected from the group of aromatic phosphate ester oligomer compounds or haloaryl phosphate compounds which experience a weight loss of no more than 40 percent at 300° C. when heated to a temperature of 500° C. in a TGA at a heating rate of 20° C. per minute.

5. A carbonate polymer composition according to claim 1 comprising (b) from about 0.2 to about 0.6 low volatility aromatic phosphate ester compound.

6. A carbonate polymer composition according to claim 1 comprising (b) from about 0.3 to about 0.5 low volatility aromatic phosphate ester compound.

7. A carbonate polymer composition according to claim 1 wherein the carbonate polymer has a weight average molecular weight of from about 26,000 to about 36,000.

8. A carbonate polymer composition according to claim 1 comprising no further ignition resistance additive(s) based on halogen; salt of an alkali metal or an alkali earth metal; antimony; bismuth; or poly(tetrafluoroethylene).

9. A carbonate polymer composition according to claim 1 characterized in that test specimens molded from the composition and having thickness of one sixteenth of an inch (1.6 millimeter) and one eighth of an inch (3.2 millimeter) have a UL-94 test rating of V-2.

10. A carbonate polymer composition according to claim 1 comprising (b) a low volatility aromatic phosphate ester oligomer compound.

11. A carbonate polymer composition according to claim 1 comprising (b) a low volatility haloaryl phosphate ester compound.

12. A carbonate polymer composition according to claim 1 comprising (b) a low volatility aromatic phosphate ester oligomer compound as represented by the formula:

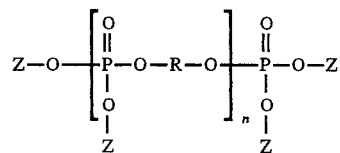

wherein R is selected from the group consisting of a divalent $C_1$–$C_{20}$ linear, branched or cyclic alkylene or alkylidene radical, or a divalent $C_6$–$C_{30}$ arylene radical having one or more aromatic nuclei, or a substituted derivative of any of same; Z is a monovalent $C_6$ arylene radical, and n is from about 1 to about 3.

13. A carbonate polymer composition according to claim 1 comprising (b) a low volatility haloaryl phosphate ester compound as represented by the formula:

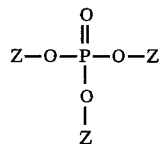

wherein independently, each R is selected from the group consisting of (ii) $C_6$–$C_{30}$ arylene radicals having one or more aromatic nuclei and (iii) brominated $C_6$–$C_{30}$ arylene radicals having one or more aromatic nuclei and having 1 to 5 bromine radicals, which haloaryl phosphate has at least one brominated $C_6$–$C_{30}$ arylene radical having one or more aromatic nuclei and having 1 to 5 bromine radicals.

14. A carbonate polymer composition according to claim 11 comprising (b) a low volatility resorcinol diphenylphosphate ester oligomer compound.

15. A carbonate polymer composition according to claim 1 comprising (b) a low volatility bisphenol A diphenylphosphate ester oligomer compound.

16. A carbonate polymer composition according to claim 1 comprising (b) tris (2,4)-dibromophenyl) phosphate.

17. A carbonate polymer composition according to claim 1 containing no further than the carbonate polymer.

18. A carbonate polymer composition according to claim 1 comprising from about 0.001 to about 0.1 weight percent (based on carbonate polymer compositions weight) of (c) the alkali metal salt.

19. A carbonate polymer composition according to claim 18 wherein (c) the alkali metal salt is an aromatic sulfur compound and the alkali metal is selected from the group consisting of sodium or potassium.

20. A carbonate polymer composition according to claim 19 wherein the alkali metal salt has a pH of at least 7.5.

21. A carbonate polymer composition according to claim 19 wherein the alkali metal salt is an aromatic sulfimide and the alkali metal is selected from the group consisting of sodium or potassium.

22. An extruded sheet prepared from the carbonate polymer according to claim 18.

* * * * *

UNITED STATES PATENT AND TRADEMARK OFFICE
CERTIFICATE OF CORRECTION

PATENT NO. : 5,663,280
DATED : September 2, 1997
INVENTOR(S) : Samuel A. Ogoe, Nancy J. Schrock, Jimmie D. Spoon It is certified that error appears in the above-indentified patent and that said Letters Patent is hereby corrected as shown below:

Claim 17, column 22, line 49 following further insert - - polymer - -

Claim 13, column 22, line 33 "R" should correctly read - - Z - -

Signed and Sealed this

Eighth Day of September, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,663,280
DATED : September 2, 1997
INVENTOR(S) : Samuel A. Ogoe, Nancy J. Schrock, Jimmie D. Spoon It is certified that error appears in the above-identified patent and that said Letters Patent is hereby corrected as shown below:

Column 21, claim 1,
Line 25, between the words -- greater than -- and -- 0.1 to less than -- delete the word "about"

Signed and Sealed this

Sixth Day of November, 2001

Attest:

NICHOLAS P. GODICI
Attesting Officer     Acting Director of the United States Patent and Trademark Office